Sept. 7, 1943. L. S. LONGENECKER 2,328,917
GLASS MELTING FURNACE
Filed June 29, 1940 3 Sheets-Sheet 1

INVENTOR
Levi S. Longenecker
By
Green & McCallister
His Attorneys

Sept. 7, 1943.  L. S. LONGENECKER  2,328,917
GLASS MELTING FURNACE
Filed June 29, 1940  3 Sheets-Sheet 2

INVENTOR
Levi S. Longenecker
By Green & McCallister
His Attorneys

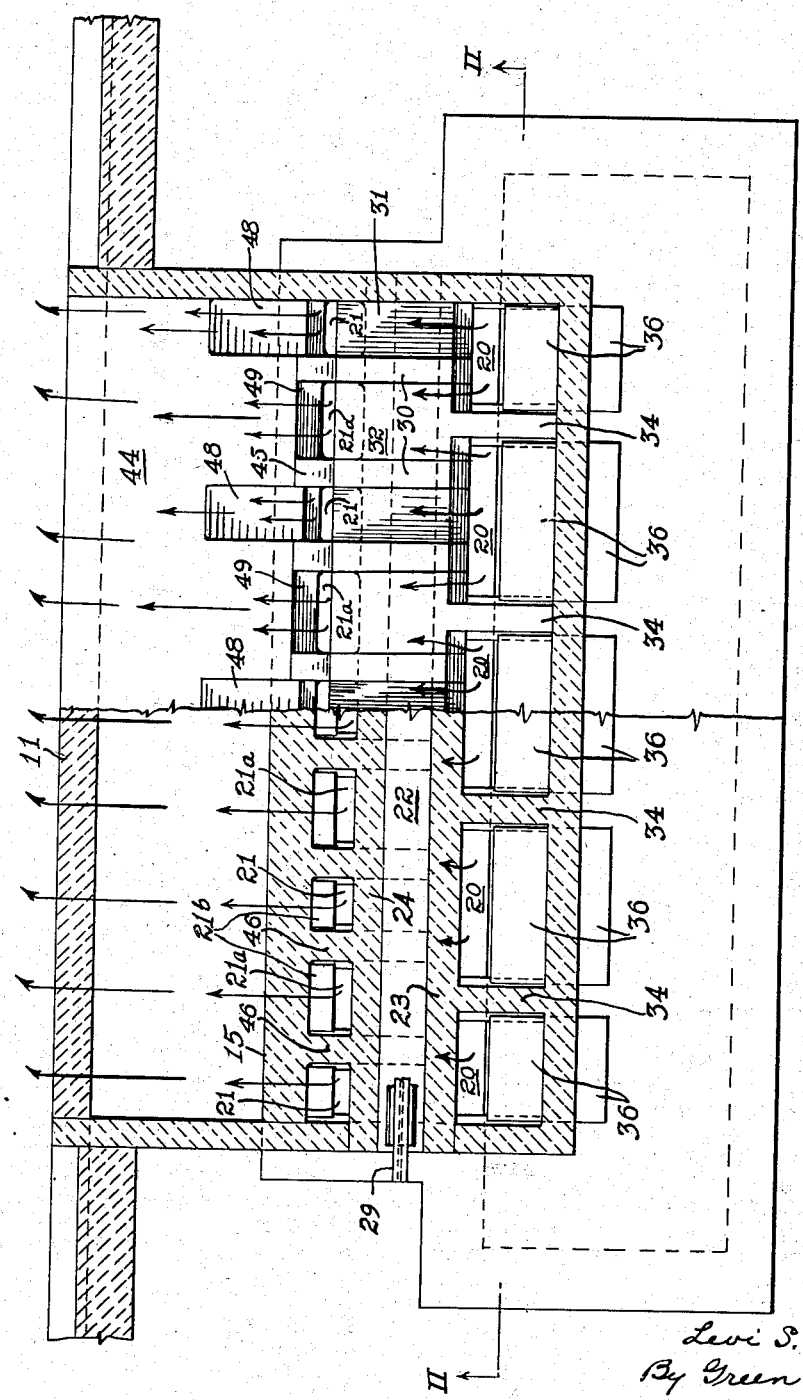

Patented Sept. 7, 1943

2,328,917

UNITED STATES PATENT OFFICE 2,328,917

GLASS MELTING FURNACE

Levi S. Longenecker, Mount Lebanon, Pa.

Application June 29, 1940, Serial No. 343,187

12 Claims. (Cl. 263—15)

This invention relates to glass melting furnaces and more particularly to the furnace ports and the furnace regenerator roofs and uptakes.

While the prior patented art discloses at least one furnace of this type which is provided with what may be termed long continuous ports, no such structure, so far as I am aware, is used in any commercially successful furnace.

The patent referred to is Showers et al. Patent 2,010,419 of August 6, 1935. This patent also discloses suspended roof structures for both the furnace chamber and the regenerative chambers.

While the advantages of long continuous ports have been recognized, and designs for the same have been known for some years, as witnessed by the above patent, no furnaces utilizing any such ports are, so far as I am aware, in actual use today. The furnaces in use today employ individual relatively short ports, and, while suspended roofs for the furnace and regenerative chambers are disclosed in said patent, no commercial furnace employing roofs of this type, so far as I am aware, is now in operation.

Since furnaces of the type here contemplated are reversed during operation, the ports not only serve to deliver the combustible mixture—made up of fuel and preheated air—to the furnace chamber, but serve as outlet ports for the hot products of combustion as they leave the furnace chamber on their way to the regenerative chambers adjacent thereto.

An object of this invention is to produce improved continuous long ports for delivering to the heating chamber of glass melting furnaces a combustible mixture of preheated air and preheated lean gas, such as producer gas.

Another object is to produce a commercially practical continuous long port for the use of producer gas in furnaces of this type and by means of which it is possible to obtain a continuous ribbon-like soft luminous flame which will cover the whole surface of the glass bath, thus eliminating shadows and idle glass surfaces.

A further object is to produce an improved suspended curtain wall for separating the uptakes of adjacent gas and air regenerators.

A still further object is to produce an improved port floor structure for use with preheated air and preheated producer gas.

A still further object is to produce a suspended hollow air cooled refractory wall for separating the adjacent uptakes of air and gas regenerators used in glass melting furnaces.

These and other objects which will be apparent to those skilled in this particular art, I attain by means of the structures described in the specification accompanying and forming part of this application.

In the drawings:

Fig. 3 is a view partially in plan and partially in horizontal section and is taken at different elevations; the right hand side of said view being taken on line III—III of Fig. 2 while the left-hand half of said view is taken on line IIIa—IIIa of Fig. 2.

In an application for patent filed by me on January 29, 1940, and serially numbered 343,186, I have disclosed a glass melting furnace which, in many respects, is similar to the furnace of this application. The furnace of my prior application is designed for the use of natural gas or oil as the fuel, while the furnace of this application is designed for the use of a lean gas such as producer gas.

Figure 1:
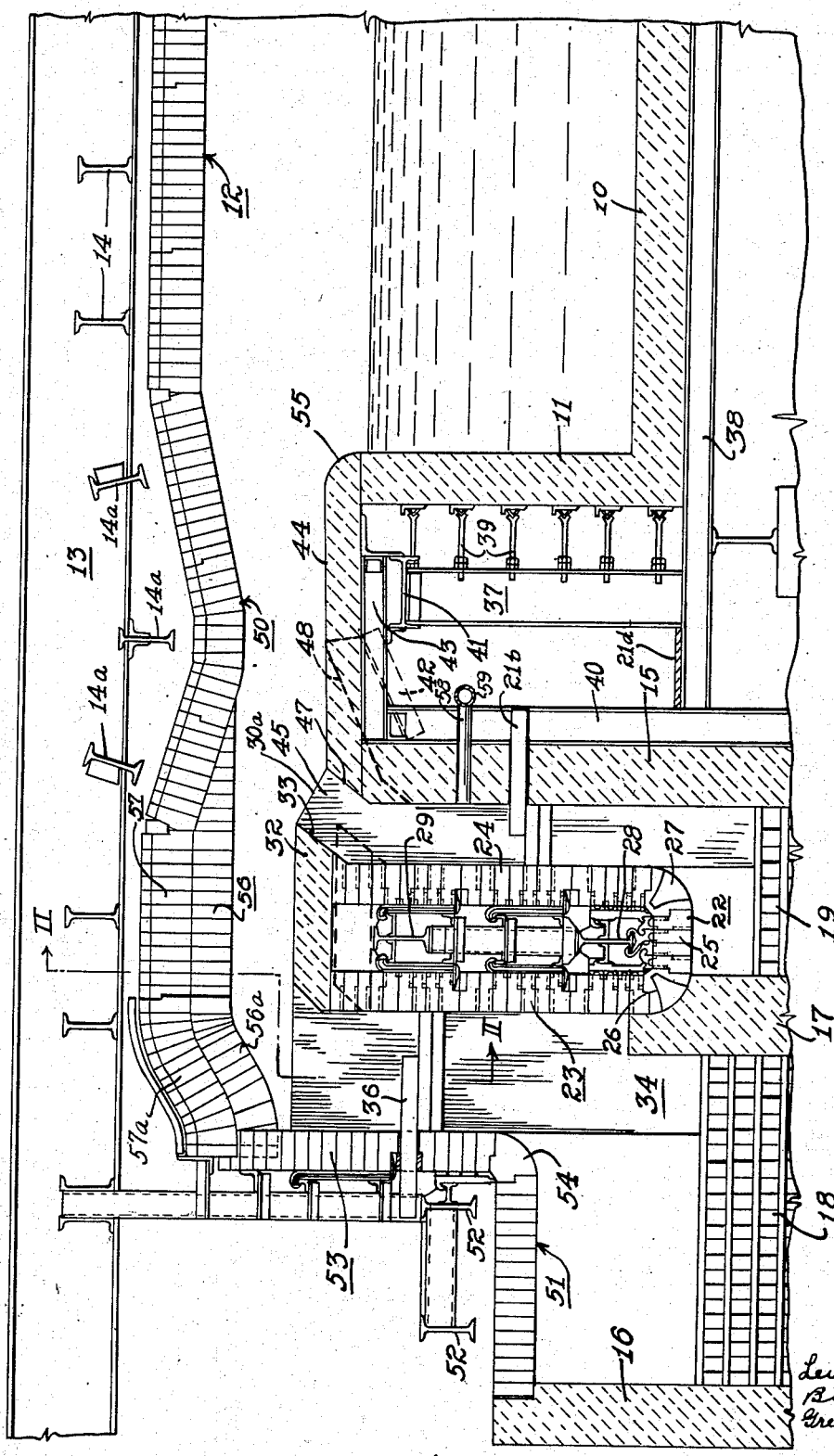
Figure 1 is a fragmentary transverse vertical section of a glass melting furnace embodying this invention. This view illustrates about one-half of the furnace above the major part of the regenerators for the gas and air.

While in Fig. 1 of the drawings, I have illustrated in transverse vertical section but one half of the furnace above the checkers of the regenerator, it will be understood that the other half is of identical construction. It will also be understood that this transverse section is representative of the furnace in either the boiling zone or the degassing zone.

In the furnace chosen as an embodiment of the invention of this application, 10 represents the refractory floor or bottom of a furnace tank of usual construction. 11 represents one of the refractory side walls of the tank. 12 represents my flat suspended roof made up of interlocking refractory tile or blocks such as broadly disclosed in Patent 1,590,303, issued to me on June 29, 1926. These tile or roof blocks are preferably suspended from transverse and longitudinal beams 13 and 14 by means of hangers as disclosed in Patent 1,913,168, issued to me on June 6, 1933.

A vertically extending refractory wall 15 spaced from tank side wall 11 forms one vertical wall of a regenerator chamber for preheating the producer gas used as fuel. A vertical wall 16 serves as the outer wall of the regenerator for preheating the air fed to the furnace. A vertical wall 17 common to the two regenerators separates the checker chambers thereof. The regenerator for preheating the air is provided with checkerwork 18 while the gas regenerator is provided with checkerwork 19. The regenerator uptakes (those for the air being numbered 20 and those for the gas being numbered 21 and 21a) are separated one from the other by a hollow suspended refractory wall which as an entirety is numbered 22, and which forms an important feature of the invention of this application.

The gas and air uptakes are formed in the nature of flues and not only serve to conduct the preheated air and gas to the furnace, but also serves as downtakes (when the furnace is reversed) for conducting the hot waste gases or products of combustion to the checker chambers of the regenerators.

The separating walls of adjacent ducts or uptakes leading to and from adjacent air and gas regenertors have been a source of trouble in the past, since there has been no adequate way of cooling the same. During operation of the furnace, they are kept constantly heated from both sides with the result that they melted away and collapsed.

My hollow wall 22 is U-shaped in cross section and comprises spaced vertical wall portions 23 and 24 formed of courses or rows of interlocking refractory blocks or tile such as broadly disclosed in said patent. The lower end portion of wall 22 is formed of interlocking refractory blocks or tile 25, and this lower end portion is joined to the vertical portions 23 and 24 and this lower wall portion is joined to the vertical portions 23 and 24 by two rows of interlocking nose blocks 26 and 27. Tile 25 are preferably supported from a horizontally extending I-beam 28 by means of hangers such as disclosed in Patent 1,913,168, while the blocks or tile forming the vertical portions 23 and 24 of said wall, as well as the nose blocks 26 and 27, are preferably supported from said I-beam 28 and an upper I-beam 29 by means of brackets and hangers as disclosed in Patent 1,977,799, issued to me on October 23, 1934.

Wall 22 has its opposite ends open to the atmosphere and if desired a forced current of cooling air may be constantly passed therethrough during the operation of the furnace. This will not only cool the refractories forming the wall structure, but will also cool the metal supporting beams, brackets and hangers.

Wall 22 preferably extends throughout the length of either or both the boiling and degassing zones of the furnace, and the top of each of its vertical wall portions 23 and 24 throughout its length is preferably notched or crenelated. In other words, each of said walls has alternating high and low portions.

Figure 2:
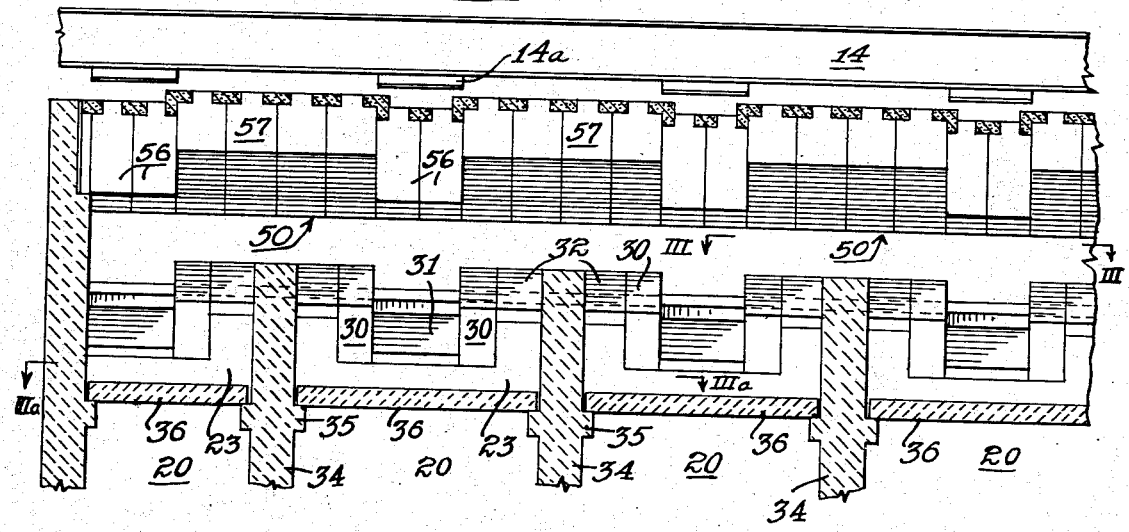
Fig. 2 is a longitudinal vertical section and is taken on line II—II of Fig. 1.
Figure 4:
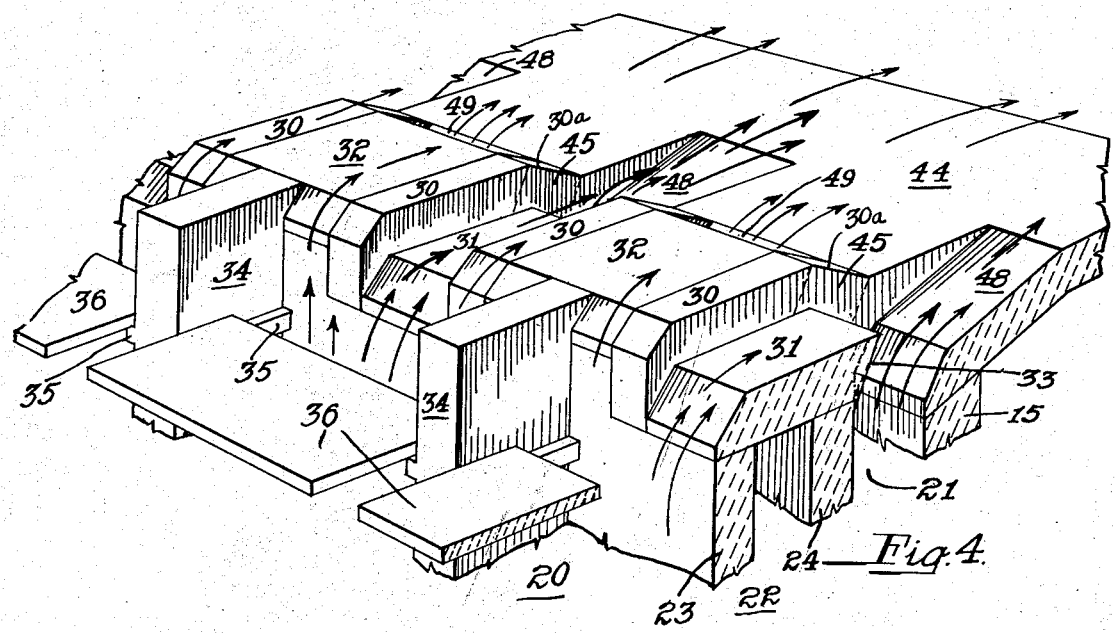
Fig. 4 is a fragmentary perspective view of a portion of the floor of my improved furnace port.

Located at each end of each low wall portion 22 is a vertically extending block 30. These blocks are supported by the wall sections 23 and 24, and located between each pair of blocks 30 is a horizontally extending floor block or tile 31. Located between blocks 30 and supported by the high portions of walls 23 and 24 are horizontally extending floor blocks 32. This is clearly shown in Figs. 2. 3 and 4 and provides a roof for hollow wall 22 having alternately positioned high and low portions.

The forward ends of tile or blocks 30, 31 and 32,—those ends of such blocks which are adjacent the uptakes 20 of the air regenerator—are beveled as shown in the drawings so as to reduce resistance to changing direction of the air streams flowing through the uptakes of the air regenerators. The rear edges of tile or blocks 30, 31 and 32 are undercut, so to speak, as shown at 33 so as to slightly overhang the uptakes 21 of the gas regenerator.

The uptake of the air regenerator is provided with vertically extending horizontally spaced partitions 34 which divide the same into the flues before referred to, and gates or dampers 36, which are supported by flanges on these partitions, are utilized for controlling the amount of air delivered to the different flues of the air uptake channel.

Partitions 46 which separate the channel leading upwardly from the gas regenerator divide the channel into gas ports 21 and 21a and each of these ports is controlled by means of a damper or gate 21b which projects through a slot formed for that purpose in vertical wall 15, and is supported on flange-like members 21c which project laterally from walls 46. By means of these dampers or gates 21b the amount of fuel supplied by different flues 21 and 21a can be controlled, and the dampers can be operated by the furnace operator; a cat walk 21d being provided for the operator.

Tank wall 11 is braced and held in position by a series of vertically extending beams 37 (only one beam being shown) carried by a series of horizontal beams 38 which support the floor 10 of the tank, and a number of brace members 39 which are carried by vertical beams 37 and which bear against the outer face of the tank wall 11. A series of vertical beams 40 (only one being shown) helps to maintain wall 15 of the gas regenerator in position. Certain of vertical beams 40, or those which fall in line with gas flues 21, are shorter than the others and the shorter beams 40 are connected at their top to a horizontally extending beam 41 which joins the tops of beams 37, by a short section of beam 42. The longer beams 40 connect with said horizontal beam 41 by means of beam sections 43. Beam sections 42 and 43 serve as supports for refractory blocks or slabs which form a floor 44, which in the main is horizontal, and which spans the space between vertical walls 11 and 15.

Vertically extending tile or blocks 30 are of such length that their rear end portions 45 cover the vertically extending partitions 46 of the gas uptake. These rear end portions have downwardly inclined tops which join the adjacent edge 47 of horizontal floor 44, as shown at 30a.

Horizontal floor 44 is lower than the tops of block or tile 30 and 32 and in line with gas flues 21 and is provided with trough-like depressed portions 48 which serve as channels for the gas flowing up through ports 21. Ports 21a which alternate with ports 21 conduct the gas flowing upwardly therethrough to outlet ports 49 which discharge their streams of gas across the horizontal portions of floor 44 between depressed portions 48 of said floor.

The roof above floor 44 is formed as a knuckle 50 from interlocking tile such as broadly disclosed in my Patent 1,590,303. The tile forming the knuckle are suspended from longitudinally extending beams 14a by means of hangers, preferably such as disclosed in Patent 2,126,901, issued to me on August 16, 1938. This knuckle extends throughout the length of horizontal floor 44, and, with said floor forms a long continuous port through which the preheated air and gas is discharged into the furnace chamber.

The lower point of said knuckle and that portion of the horizontal floor immediately therebeneath forms the throat or neck of said port, and it will be obvious that this lower point of the knuckle can be located at just the proper position with relation to inner edge 55 of floor 44 so as to locate the shadow or cold spot on the port floor instead of on the surface of the glass directly in front of the port, as happens in present day commercial furnaces.

The roof 51 of the air regenerator chamber is located below the port floor as in my application Serial No. 343,186, and as in said application, is preferably formed by refractory tile or blocks such as broadly disclosed in my Patent 1,590,303. These tile or blocks are preferably suspended from longitudinal beams 52 in the manner disclosed in my Patent 2,126,901. The outer vertical wall of the air regenerator uptake is formed of interlocking refractory blocks 53 such as above referred to and these are preferably supported in the manner disclosed in my Patent 1,977,799. A row or course of nose blocks 54 joins the roof and vertical wall portions and is preferably constructed and supported in the manner disclosed in said latter patent.

That portion of the furnace roof located between knuckle 50 and the vertical wall of the air regenerator uptake is made up of alternately arranged courses of long tile or blocks 56 and short tile or blocks 57. These courses of long blocks in effect provide guiding vanes which extend from the outer vertical wall of each air uptake to knuckle 50 and serve as guide vanes to prevent side slipping of the air stream as its flows from the regenerator uptake flues to the furnace port.

From the above, it will be seen that the preheated air passing from the uptake flues of the air regenerator over the tops of blocks 30, 31 and 32 flows in a substantially unbroken stream which is guided and prevented from side slipping by blocks or tile 30 and 32 and long roof tile 56.

The gas from uptake flues 21 and 21a enters the throat of a port with the minimum of interference from the air stream, and, since the tops of the gas outlet ports turn inwardly toward the throat, the gas streams are so directed into the air stream that any tendency to turbulency in the intermixing of air and gas, ahead of the port throat or neck, is reduced to a minimum. It is at the port throat or neck of course, where the real mixing of gas and air takes place, and the throat or neck is the point of flame control or anchor.

Because of the fact that that portion of the port floor made up of the tops or upper surfaces of blocks 30 and 32 is higher than the horizontal floor portion 44, the preheated air passing over blocks 30 and 32 forms a preheated air blanket which overlies the gas streams issuing from ports 21a. A like situation occurs in regard to the preheated air streams passing over floor blocks 31 since these blocks are higher than the inclined top faces of the depressed portions 48 of floor 44. In other words, the air streams passing over blocks 30 overlie the gas streams issuing from flues 21.

The inclined roof section 57a, with its depending guides vanes 56a, turns the preheated air passing through the air regenerator uptakes and causes the same to flow, without side slipping, over the port floor with its different levels, so that the preheated gas enters the under side of the air stream with a minimum of turbulency—both air and gas coming in contact while moving in parallel streams.

The upper portion or layer of the air stream forms a blanket which protects the knuckle as well as the roof 12 of the heating chamber from direct flame impingement. This not only prevents carbon deposition, but excessive wear and tear on the refractories forming the knuckle and the furnace roof. The knuckle, in conjunction with the port floor, is the flame control and anchor point as described in connection with my application Serial No. 343,186.

By means of dampers 36 and 21b, it is possible, with the continuous port of this invention, to place the point of heaviest firing so that it will at all times completely blanket the boiling zone and particularly the foam line.

If desired, I may employ a knuckle extending along or adjacent the longitudinal center line of the zone in which my ports are used, that is, along the center line of the boiling zone or the center line of the degassing zone, as the case may be, or along the center line of both of these zones, as disclosed in my said application Serial No. 343,186, in order to establish a point of turbulency to complete the mixing of air and any unburned gas. This final rapid mixing insures complete combustion of all the gas before it enters the port which at the time is serving as the outlet port, and provides a uniform temperature across the furnace chamber from port to port. This is important because combustion which is completed in the outlet ports is not only wasteful of gas and loss of temperature ahead of the port, but adds to the wear and tear on the port refractories.

This turbulency producing knuckle instead of being continuous may, if desired, be formed as disclosed in Figure 6 of my application, Serial No. 343,181, that is with alternating flat and depressed sections. Such a construction will not only produce turbulency, but the depressed sections will serve as guiding vanes to keep the flame from side slipping.

In cases where it is desired to enrich a lean gas with a rich gas, dampers 21b, in the smaller flues 21 can be closed. The rich gas can then be fed to flues 21 above the closed dampers 21b through pipes 58 which project through openings formed in wall 15 and which connect with a rich gas header 59. The hot flues above the closed dampers will serve as cracking chambers for the rich gas admitted thereto. The cracked gas will thus enrich the combustible mixture. The closed dampers will, of course, prevent preheated producer gas from passing up through these closed off flues.

It of course will be understood that flues 21a will still serve to convey preheated producer gas from the gas regenerator to the fuel stream.

Having thus described my invention, what I claim as new and desire to secure by Letters Patent is:

1. In a glass melting furnace of the type having a furnace heating chamber, a tank for a molten glass bath below said chamber, a pair of regenerators on opposite sides of said tank for preheating air and gas and having vertically extending uptakes, vertically extending partitions separating the gas uptakes into flues, and dampers for closing off certain of said gas flues, means for discharging a rich gas such as natural gas into said closed off flues above said dampers.

2. In a glass melting furnace, a furnace heating chamber, a tank below said chamber, relatively long ports on opposite sides of said chamber and each having its roof formed as a suspended knuckle, adjacent vertically extending uptakes of air and gas regenerators, and a suspended hollow refractory structure forming one wall of each uptake and having a top which bridges the space between said uptakes and is provided with cops and crenelles which alternate throughout the port length.

3. In a glass melting furnace having a heating chamber, a tank below said chamber, ports on opposite sides of said chamber and each having its floor substantially flat and its roof formed as a suspended knuckle, a gas regenerator having a vertically extending uptake adjacent the rear of said port floor and an air regenerator having its uptake spaced from the gas uptake by a hollow refractory wall having its top or roof located between said uptakes and formed of alternating high and low sections; said port floor in line with said low sections being depressed to provide gas troughs or channels.

4. In a glass melting furnace of the type having a heating chamber, a tank below said chamber, side ports above said tank for alternately discharging into opposite sides of said chamber a combustible mixture of air and gas, and a pair of regenerators on each side of said tank for preheating said air and gas and having vertically extending uptakes divided into flues, with those of the gas regenerators located closer to the tank than those of the air regenerators; each side port comprising a substantiallly flat floor portion which extends from the tank to the adjacent gas uptake flues and is provided with multiple grooves which line up with alternate gas flues and have bottoms which incline downwardly from said flat portion toward said gas flues, and a port roof which is formed as a suspended knuckle, in combination with a floor which extends from said gas uptake to the adjacent air uptake and is made up of alternate high and low portions with said low portion aligned with the grooves in the flat floor portion.

5. In a furnace having ports for alternately discharging into the furnace heating chamber preheated air and gas, a pair of regenerators within which said air and gas are preheated, and having vertically extending uptakes, a suspended roof above said uptakes and said ports and which is provided with guide vanes for preventing side-slipping of the preheated air and gas issuing from said uptakes.

6. In a tank type glass melting furnace having side ports for alternately discharging into opposite sides of the furnace heating chamber preheated air and gas, pairs of regenerators on opposite sides of the furnace for preheating said air and gas; each pair of regenerators having vertically extending adjacent uptakes, a hollow U-shaped refractory structure separating said uptakes and serving as one wall of each such uptake, and means extending lengthwise through said hollow structure for suspending the same.

7. In a tank type glass melting furnace having side ports for alternately discharging into opposite sides of the furnace heating chamber preheated air and gas, a pair of regenerators for each port and having vertically extending uptakes, a hollow U-shaped refractory structure made of interlocking refractory tile serving as a separating wall common to said uptakes, and horizontal beams extending lengthwise through the space within said hollow structure for supporting said structure.

8. In a tank type glass melting furnace having side ports for alternately discharging into opposite sides of the furnace heating chamber preheated air and gas, a pair of regenerators for preheating the air and gas delivered to each port, and having vertically extending uptakes, a hollow U-shaped structure which is open at both ends to the atmosphere outside of the furnace, is made up of interlocking refractory tile, and serves as a common wall separating said uptakes, and means extending lengthwise through and beyond the ends of said hollow structure for supporting the same.

9. In a tank type glass melting furnace having ports for discharging preheated air and gas into the furnace chamber above the tank, air and gas regenerators for supplying preheated air and gas to each port and arranged with their checkerwork located below said tank, a pair of uptakes extending vertically from said regenerators to the port level, and being separated by a hollow refractory structure having a horizontal length at least equal to the length of one of said ports; said hollow refractory structure comprising spaced vertical walls, and a lower horizontal wall; said walls being formed of interlocking refractory tile supported by means which extend horizontally through the space between said vertical walls.

10. In a furnace having a port which serves as an inlet port for preheated air and gas and as an outgoing port for hot products of combustion, a pair of regenerators located a distance below said port and having a channel which extends upwardly therefrom to the port level, a substantially U-shaped refractory structure which has its ends open to the atmosphere and divides said channel into two parts, one of which serves to conduct preheated gas from one regenerator to such port and to conduct hot products of combustion from said port to said regenerator, and the other of which serves to conduct preheated air from the other regenerator to said port and hot products of combustion from said port to said other regenerator, and beams which pass lengthwise through the space within said hollow U-shaped structure for supporting said structure.

11. In a tank type glass melting furnace, a port having a knuckle-like suspended roof, a floor below said roof, which in the main is flat, but which along its edge removed from said tank is provided with spaced depressed portions, a pair of regenerators for supplying said port with preheated air and gas and each having a passage which extends from its checkerwork to a point above the port level, a U-shaped refractory structure which separates said passages into air and gas uptakes and is open at both ends to the atmosphere, a refractory cover carried by said structure and having portions thereof located above the port level, and lower portions which are aligned with the depressed portions of the port floor, and means extending lengthwise through and beyond the ends of said hollow U-shaped structure, for supporting the same.

12. In a tank type furnace having ports for alternately discharging into the furnace heating chamber preheated air and gas, a pair of regenerators within which said air and gas are preheated, and having vertically extending uptakes, a hollow U-shaped refractory structure separating said uptakes, means extending lengthwise through said hollow structure for suspending the same, vertically extending walls dividing each uptake into flues, and adjustable dampers for controlling the effective area of said flues.

LEVI S. LONGENECKER.

2,328,917

CERTIFICATE OF CORRECTION.

Patent No. 2,328,917. September 7, 1943.

LEVI S. LONGENECKER.

It is hereby certified that error appears in the printed specification of the above numbered patent requiring correction as follows: Page 3, second column, line 37, for the serial number "343,181" read --343,188--; and that the said Letters Patent should be read with this correction therein that the same may conform to the record of the case in the Patent Office.

Signed and sealed this 16th day of November, A. D. 1943.

(Seal)
Henry Van Arsdale,
Acting Commissioner of Patents.